(12) United States Patent
Delaurier

(10) Patent No.: US 7,730,631 B2
(45) Date of Patent: Jun. 8, 2010

(54) DEVICE FOR CHECKING ACCURACY OF A RIGHT ANGLE

(76) Inventor: Armand Delaurier, 42 Noble Avenue, Winnipeg (CA) R2L 0J4

(*) Notice: Subject to any disclaimer, the term of this patent is extended or adjusted under 35 U.S.C. 154(b) by 69 days.

(21) Appl. No.: 12/273,734

(22) Filed: Nov. 19, 2008

(65) Prior Publication Data

US 2009/0139106 A1 Jun. 4, 2009

Related U.S. Application Data

(60) Provisional application No. 60/991,897, filed on Dec. 3, 2007.

(51) Int. Cl.
*G01B 3/10* (2006.01)
(52) U.S. Cl. .................................... 33/759; 33/679.1
(58) Field of Classification Search ............. 33/494, 33/679.1, 759, 760, 766
See application file for complete search history.

(56) References Cited

U.S. PATENT DOCUMENTS

| | | | | |
|---|---|---|---|---|
| 1,497,492 A | * | 6/1924 | Engel | 33/494 |
| 5,230,158 A | * | 7/1993 | Wall | 33/759 |
| 5,251,382 A | * | 10/1993 | Hellar | 33/759 |
| 5,519,943 A | * | 5/1996 | Snyder | 33/494 |
| 5,875,557 A | * | 3/1999 | Ueki | 33/494 |
| 6,536,124 B1 | * | 3/2003 | Eskew et al. | 33/471 |
| D540,207 S | * | 4/2007 | Ikeda | D10/71 |
| 2003/0126752 A1 | * | 7/2003 | Brandon et al. | 33/494 |
| 2005/0072009 A1 | * | 4/2005 | Doublet | 33/1 G |
| 2009/0307920 A1 | * | 12/2009 | Schrage | 33/760 |

* cited by examiner

*Primary Examiner*—G. Bradley Bennett
(74) *Attorney, Agent, or Firm*—Adrian D. Battison; Ade & Company Inc.

(57) ABSTRACT

A tape measure has a first scale on one edge of the blade and a second scale on the other edge blade where the second scale is marked in units of length which are equal to the units of the first scale multiplied by the square root of 2. A method to check a right angle measures from a corner to a distal end of a first line using the units of the first scale, measures along a second line an equal length in the first units from the corner and marking a point, by measuring from the distal end to the point using the second scale and by adjusting an angle between the first and second lines at the corner until the distance between the distal end and the point is equal to the length of the first line when measured on the second scale.

7 Claims, 4 Drawing Sheets

DEVICE FOR CHECKING ACCURACY OF A RIGHT ANGLE

This application claim the benefit under 35 U.S.C. 119 of Provisional Application Ser. No. 60/991,897 filed Dec. 3, 2007.

This invention relates to a device which can be used to simply and quickly detect whether two straight lines are accurately at a right angle to one another.

The device is particularly designed for use in construction of a deck, floor, wall or the like where two members of the construction are intended to be accurately at a right angle or "square". However the device can be used in other operations for example in wood working, metal working or the like where two straight lines are required to be accurately square. Other end uses can also be contemplated.

SUMMARY OF THE INVENTION

It is one object of the invention to provide a device which can be used to simply and quickly detect whether two straight lines are accurately at a right angle to one another.

According to one aspect of the invention there is provided a device for use in detecting whether two straight lines are accurately at a right angle to one another comprising:

a tape measure having a blade;

a first scale on the blade which is marked along the blade in units of length;

a second scale on the blade which is marked in units, each of which has a length which is equal to a unit of length of the first scale multiplied by the square root of 2.

Preferably the first scale is along one edge of the blade and the second scale is along an opposed second edge of the blade. This arrangement clearly separates the scales for easy reading without confusion.

The units on the first scale can be equal to 1.0 inches so that on the second scale the units are equal to 1.414 inches.

The units on the first scale can be equal to 1.0 cms so that on the second scale the units are equal to 1.414 cms.

Preferably the units on the metric scale are divided into 10 sub-units. On the imperial scale the units can be divided into 16 sub-units.

In accordance with a second aspect of the invention there is provided a method for detecting whether first and second straight lines are accurately at a right angle to one another at a corner comprising:

providing a tape measure having a blade with a first scale on the blade which is marked along the blade in first units of length and a second scale on the blade which is marked in second units, each of which has a length which is equal to a unit of length of the first scale multiplied by the square root of 2;

measuring along the first line from the corner to a distal end of the first line to provide an indication of its length in the units of the first scale;

measuring along the second line a distance in the first units from the corner which is equal to the length of the first line and marking a point at the measured distance;

measuring from the distal end of the first line to the point using the second scale;

and adjusting an angle between the first and second lines at the corner until the distance between the distal end and the point is equal to the length of the first line when measured on the second scale.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
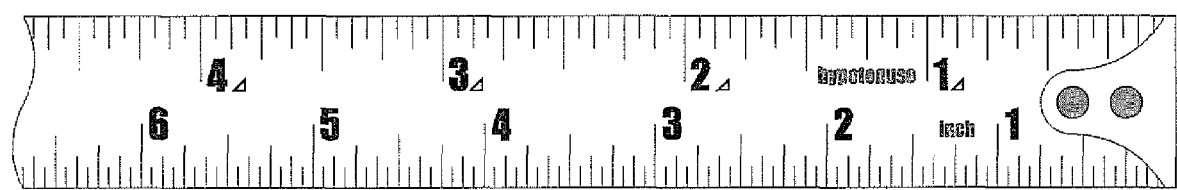
FIG. 1 is a front elevational view of a portion of a tape measure according to the present invention.

The tape measure 10 of FIG. 1 includes a blade 11 with a first scale 13 on the blade on one side edge which is marked along the blade in units of length which are either inches or centimetres. On the other side edge is a second scale 12 on the blade which is marked in units, each of which has a length which is equal to a unit of length of the first scale multiplied by the square root of 2 which is 1.414.

Figure 2:
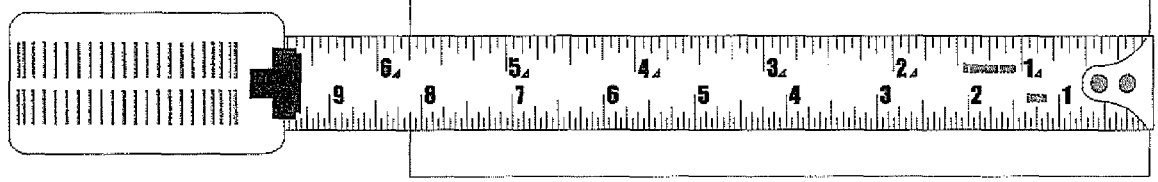
FIGS. 2, 3 and 4 show separate steps in the method of use of the measure of FIG. 1.

In the method of use, the measure is used in a method for detecting whether first and second straight lines are accurately at a right angle to one another at a corner. In FIG. 2 the tape measure is provided having the blade with the first scale and the second scale. In FIG. 2 the measure is used for measuring along a first line 15 from the corner 17 to a distal end 18 of the first line to provide an indication of its length in the units of the first scale 13.

Figure 3:
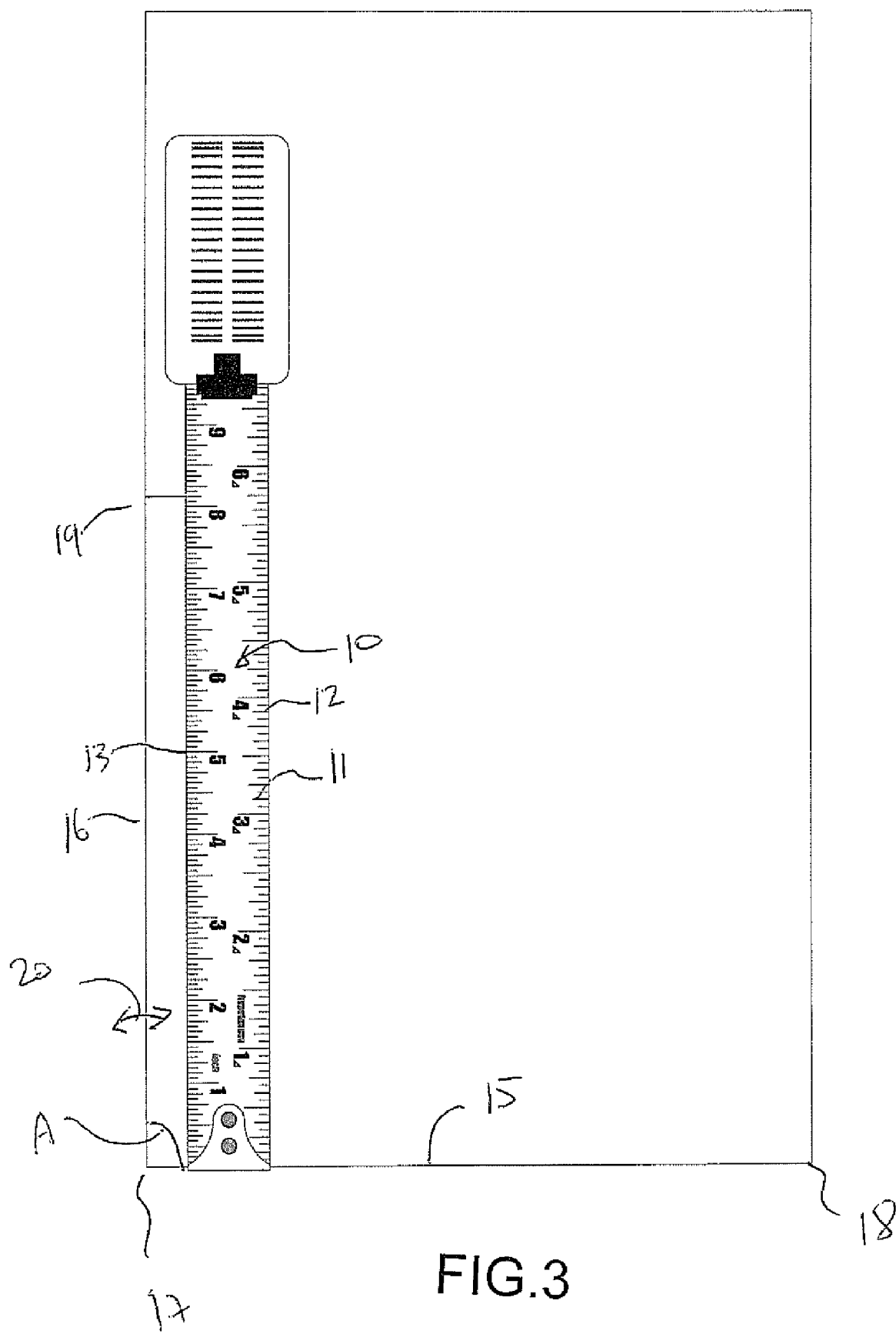
Figure 4:
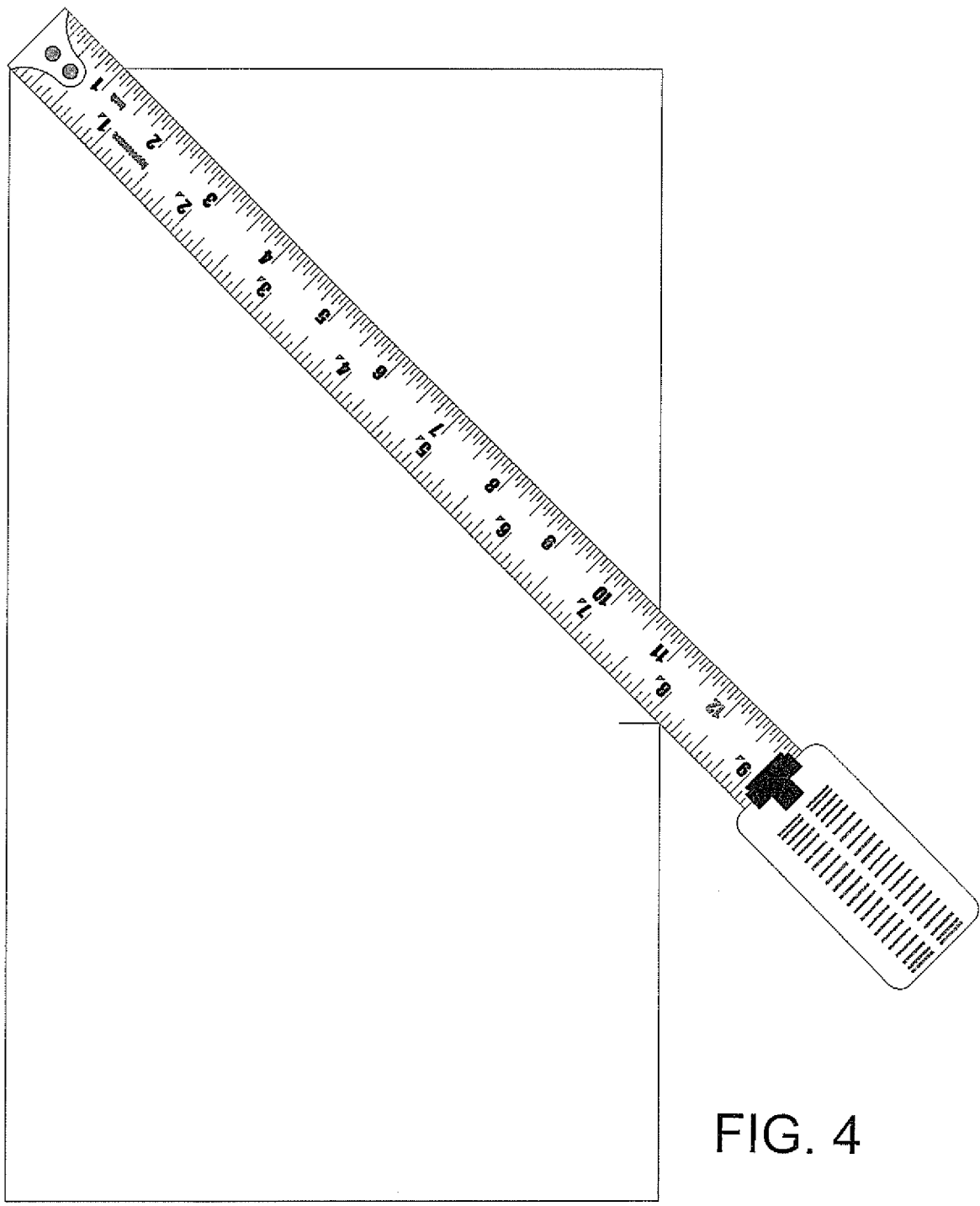

In the second step in FIG. 3, the tape is used for measuring along the second line 16 a distance in the first units from the corner 17 which is equal to the length of the first line and marking a point 19 at the measured distance;

In the third step the tape is used for measuring from the distal end 18 of the first line to the point 19 using the second scale 12 and adjusting as indicated at 20 an angle A between the first and second lines at the corner 17 until the distance between the distal end and the point is equal to the length of the first line when measured on the second scale.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A device for use in detecting whether two straight lines are accurately at a right angle to one another comprising:
    a tape measure having a blade;
    a first scale on the blade which is marked along the blade in units of length;
    a second scale on the blade which is marked in units, each of which has a length which is equal to a unit of length of the first scale multiplied by the square root of 2.

2. The device according to claim 1 wherein the first scale is along one edge of the blade and the second scale is along an opposed second edge of the blade.

3. The device according to claim 1 wherein on the first scale the units are equal to 1.0 inches and on the second scale the units are equal to 1.414 inches.

4. The device according to claim 1 wherein the units on each scale are divided into 16 sub-units.

5. The device according to claim 1 wherein on the first scale the units are equal to 1.0 cms and on the second scale the units are equal to 1.414 cms.

6. The device according to claim 1 wherein the units on each scale are divided into 10 sub-units.

7. A method for detecting whether first and second straight lines are accurately at a right angle to one another at a corner comprising:

provide a tape measure having a blade with a first scale on the blade which is marked along the blade in first units of length and a second scale on the blade which is marked in second units, each of which has a length which is equal to a unit of length of the first scale multiplied by the square root of 2;

measuring along the first line from the corner to a distal end of the first line to provide an indication of its length in the units of the first scale;

measuring along the second line a distance in the first units from the corner which is equal to the length of the first line and marking a point at the measured distance;

measuring from the distal end of the first line to the point using the second scale;

and adjusting an angle between the first and second lines at the corner until the distance between the distal end and the point is equal to the length of the first line when measured on the second scale.

\* \* \* \* \*